R. W. WHITNEY.
Sewing-Machine Cover.
No. 162,127.    Patented April 13, 1875.
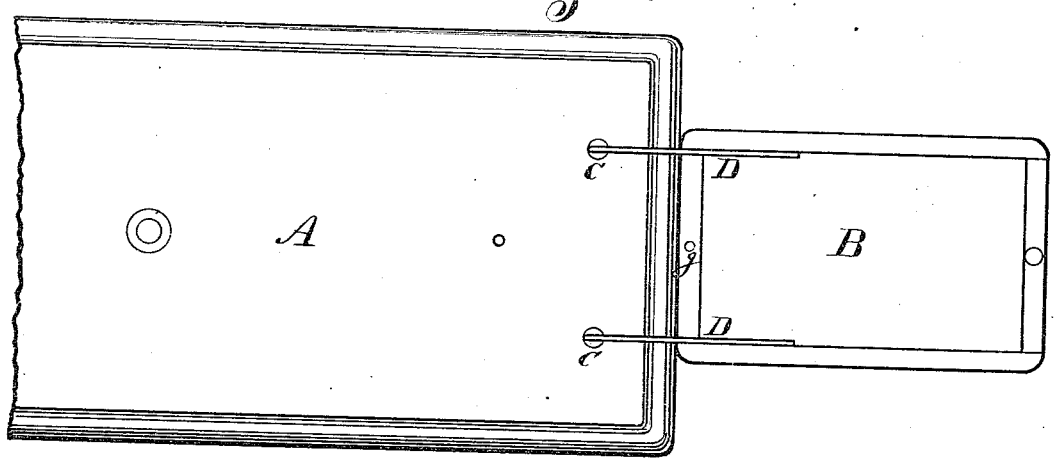
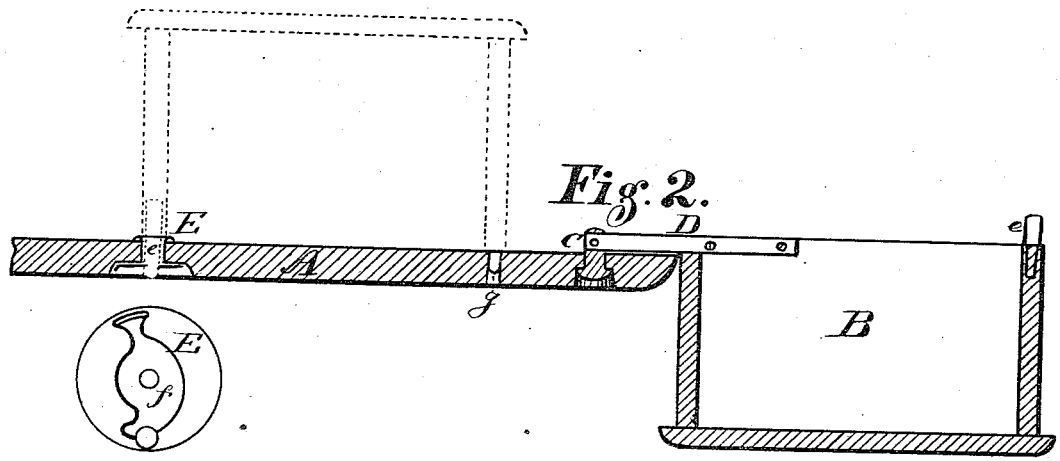
Witness.    Inventor.
William Seafert Jr    Ruel W. Whitney
H. B. Tibbitts    By Geo. W. Tibbitts, Atty.

UNITED STATES PATENT OFFICE.

RUEL W. WHITNEY, OF CLEVELAND, OHIO, ASSIGNOR TO WILSON SEWING-MACHINE COMPANY, OF SAME PLACE.

IMPROVEMENT IN SEWING-MACHINE COVERS.

Specification forming part of Letters Patent No. 162,127, dated April 13, 1875; application filed January 18, 1875.

*To all whom it may concern:*

Be it known that I, RUEL W. WHITNEY, of Cleveland, Cuyahoga county, Ohio, have invented an Improvement in Sewing-Machine Covers, of which the following is a specification:

This invention relates to covers for sewing-machines; and consists in attaching the cover to the table of a sewing-machine permanently by hinges of a peculiar construction, in such a manner as to permit it to be turned from off the sewing-machine and lodged at the end of the table, so that the lower edge of the cover will be about on a level with the table, thereby obviating the necessity of removing the cover from the table, and at the same time utilizing the cover as a work box or basket.

To enable others to fully understand my invention, I will proceed to describe it in detail by the aid of the accompanying drawings, in which—

Figure 1 is a top or plan view. Fig. 2 is a longitudinal section.

A, Figs. 1 and 2, is a table-top. B is the sewing-machine cover, attached to the table-top by hinges constructed as follows: C are studs placed through tight-fitting holes in the table from its under side, and made with a flange or head on one end, and at the other end with a slot, in which the bars D are pivoted. These bars should be no wider than the diameter of the stud, in order to permit of their being pivoted to the studs before the said studs are placed through the holes in the table, thereby making the hinges much easier to attach than to rivet the bars to the studs after they are put through the table. After the studs C are put through the table the bars D are inserted in the slots cut in the end of the cover B, and then secured to the sides of the cover.

It will be observed that the bars D are made to lie edgewise on the table A, in order to make the hinges neat and compact, and of sufficient strength to securely hold up the box. A pin, *g*, is placed in the edge of the hinged end of the cover, which enters a hole in the table when the cover is placed on the machine. This pin forms additional solidity to the compactness of the cover and the table.

Having thus described my invention, I claim—

1. The cover of a sewing-machine table, secured thereto by hinges C D C D, inserted through said table and attached to the cover, substantially as shown and described.

2. The combination of cover B, table A, and a hinge composed of stud C and bar D, substantially as described.

R. W. WHITNEY.

Witnesses:
   AUGUSTUS ZEHRING,
   GEO. W. TIBBITTS.